S. KELLER.
Thill-Couplings.
No. 133,782.
Patented Dec. 10, 1872.
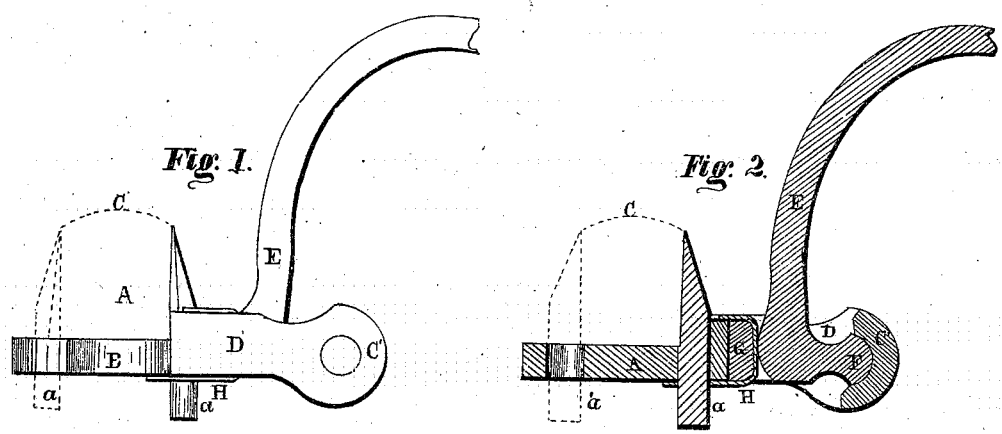
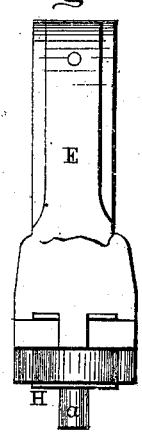
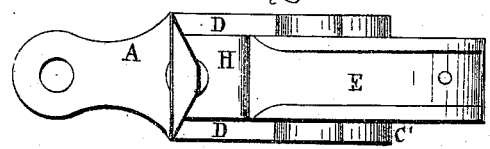
Witnesses.
C. N. Pond
A. Hornett.
Inventor.
S. Keller.
Per Burridge & Co.
Attys.

UNITED STATES PATENT OFFICE.

SAMUEL KELLER, OF EAST CLEVELAND, OHIO.

IMPROVEMENT IN THILL-COUPLINGS.

Specification forming part of Letters Patent No. 133,782, dated December 10, 1872.

*To all whom it may concern:*

Be it known that I, SAMUEL KELLER, of East Cleveland, in the county of Summit and State of Ohio, have invented a certain new and Improved Thill-Clip; and I do hereby declare that the following is a full, clear, and complete description thereof, reference being had to the accompanying drawing making part of the same.

Figure 1 is a side view of the coupling. Fig. 2 is a vertical section. Fig. 3 is an end view. Fig. 4 is a plan view.

Like letters of reference denote like parts in the different views.

The nature of this invention relates to a thill-coupling; and the object thereof is to attach the thills to the carriage without the use of bolts, and in such a way that said thills can be detached from the clip by lowering the ends of the thills, which admits of their detachment therefrom or their attachment thereto, as the case may be.

Of the construction and operation of the aforesaid coupling the following is a more specific description:

In the drawing, Fig. 1, A represents a clip or section of the coupling, B being that part directly attached to the axle-tree, and which attachment is made in the ordinary way by a band indicated by the dotted line C and nuts screwed on the lower ends *a* thereof. The front end of the clip or section consists of the two sides D, between the cheeks of which is fitted the end of the reach E to which the thills are secured. It will be observed that the end of the reach is in the form of a right-angled hook, and that the extreme end of the hook is rounded to a semicircle forming a head, F, Fig. 2. Said head is made to fit in a corresponding concave formed on the inner side of the bar C' connecting the two sides D, as shown in said Fig. 2, which represents a longitudinal vertical section of the reach and clip coupled to each other as when in practical use. The head F referred to is kept in close contact with the concave by means of a rubber block, G, or other spring interposed between the back of the reach and the clip. Said rubber or spring is retained in position by a guard-slide, H. The end of said slide is directly between the rubber and reach, and against which the reach has its bearing, whereas the arms of the slide reach back over and under the clip, and through which passes the bolt end of the band C. The holes in the arms of the slide being much larger than the bolt allows the slide to move backward and forward as the expansion and contraction of the rubber may require to keep the end of the reach in close relation to the concave of the clip.

The practical operation of the above-described coupling is as follows: The clip is attached to the axle-tree by placing the part B under it and securing it thereto by the band C and nuts screwed on the ends *a*, as aforesaid. The position of the clip when thus secured to the axle-tree is as shown in Figs. 1 and 2. The end of the thill or the reach part E thereof is coupled to the clip by lowering the outer end which will permit the insertion of the head F into the clip. Now, on raising the thills to the position shown in Figs. 1 and 2, and which is that when in practical use, the head slides into the concave in consequence of the elasticity of the rubber being exerted upon the back of the reach, and which is thereby retained in close relation with the concave and also prevented from rattling. It will be obvious that by this coupling the thills can be attached to the carriage in an easy and secure manner, and detached therefrom with equal facility, and that without the use of a bolt or pin in making the connection.

What I claim as my invention, and desire to secure by Letters Patent, is—

The herein-described thill-coupling, consisting of the clip A provided with a concave-bar, C, in combination with the reach E of the thill having a corresponding head, F, to fit in said concave, slide H, and rubber G or its equivalent, all so constructed and arranged that the thills can be attached to the clips or detached therefrom by lowering the ends of said thills, substantially in the manner as and for the purpose set forth.

SAMUEL KELLER.

Witnesses:
JOHN H. BURRIDGE.
A. F. CORNELL.